April 2, 1957 R. J. EHRET 2,787,511
INDICATING AND RECORDING APPARATUS
Filed Sept. 17, 1952 2 Sheets-Sheet 1

INVENTOR.
ROBERT J. EHRET
BY Arthur H. Swanson
ATTORNEY

April 2, 1957 R. J. EHRET 2,787,511
INDICATING AND RECORDING APPARATUS
Filed Sept. 17, 1952 2 Sheets—Sheet 2

INVENTOR.
ROBERT J. EHRET
BY
ATTORNEY.

United States Patent Office 2,787,511
Patented Apr. 2, 1957

2,787,511

INDICATING AND RECORDING APPARATUS

Robert J. Ehret, Philadelphia, Pa., assignor to Minneapolis-Honeywell Regulator Company, Minneapolis, Minn., a corporation of Delaware Application September 17, 1952, Serial No. 310,019

11 Claims. (Cl. 346—29)

The present invention relates to apparatus for determining the functional characteristics of an operating apparatus. The invention is particularly useful in carrying out investigations for determining optimum process or control characteristics.

In its more specific aspects, the present invention is concerned with apparatus for measuring the electrical characteristics of a sinusoidally varying wave. More specifically, the present invention is concerned with apparatus for measuring and recording electrical characteristics of a sinusoidally varying wave where that wave may be used to indicate the response and operating characteristics of a device or apparatus under examination.

In present day industrial control problems it is frequently necessary to know the operating characteristics of a process under examination as well as the characteristics of the components which are being used to control that process. One way of determining the operating characteristics of a process or of a device under test is to feed into the device or process a control signal of known characteristic. By having the known characteristic and taking a measure of the output of the device or process it is possible to determine the ability of the device or process to follow the input control signal. This output control signal when properly recorded is useful in determining the gain and phase shift present in a process or device. By varying the frequency of an input control signal to the process or device it is possible to determine by comparison of the recorded output with the input the operating characteristics of the process or device. In order to have wide use, it is essential that such an apparatus be able to operate at very low frequencies and yet maintain a permanent and accurate record of the response of the device or process. The response of the device or process to a given input is sometimes referred to as the transfer function. The term transfer function may be defined as the manner in which a known signal is transferred through the device or process and the characteristics it will have when it appears at the output.

It is accordingly an object of the present invention to provide a new and improved measuring apparatus for measuring the electrical characteristics of a varying signal.

Another object of the present invention is to provide a new and improved measuring and recording apparatus for measuring the electrical characteristics of an input signal to a device and the output signal of the device so that the transfer function of the device may be determined.

Still another object of the present invention is to provide a new and improved measuring and recording apparatus for determining amplitude and phase characteristics of an electrical signal with respect to a reference signal.

A further object of the present invention is to provide an apparatus for permanently recording by a two coordinate recorder mechanism the relationship between two sinusoidal functions; one produced by a mechanical sine wave generator, the other representing the output of a device or process having the generated signal as an input.

A still further object of the present invention is to provide a permanent recording of the electrical characteristics of a sinusoidally varying wave with respect to an input wave by electro-mechanical switching means synchronized to operate during predetermined portions of the sinusoidally varying input wave and with the switching means controlling the operation of the recorder to produce adjustments of the recorder to indicate two right angle components representing a vector which represents the output wave with respect to the input wave.

The various features of novelty which characterize the invention are pointed out with particularity in the claims annexed hereto and forming a part of the specification. For a better understanding of the invention, however, its advantages, and specific objects attained with its use, reference should be had to the accompanying drawings and descriptive matter in which is illustrated and described a preferred embodiment of the invention.

Figure 1:
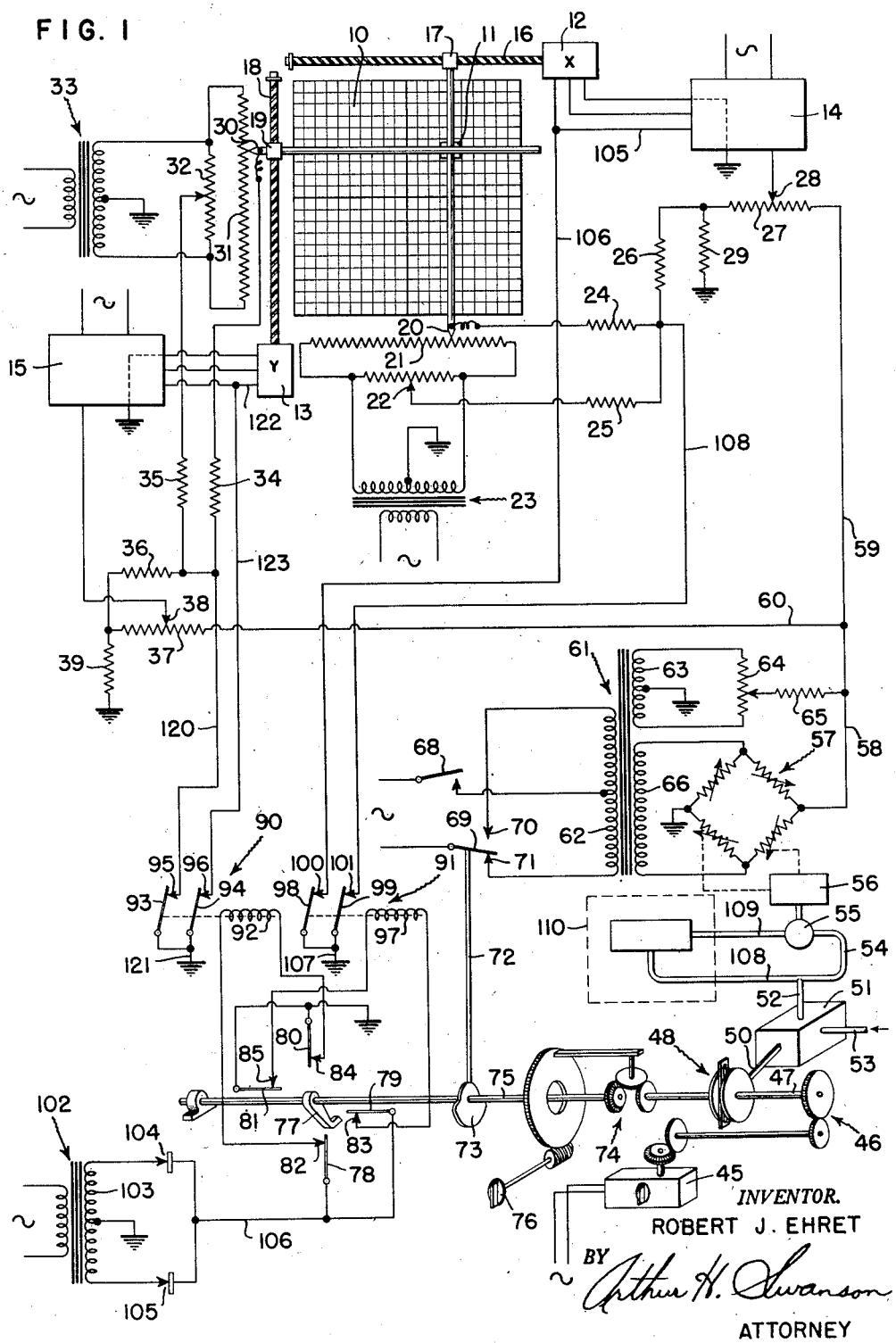
Figure 1 represents a diagrammatic showing of the present invention.

Referring now to Figure 1, the numeral 10 represents a recording chart which may have on the face thereof rectangular coordinates. This may be referred to as an X—Y recorder chart. This may have polar coordinates. Movable over the chart is a recording mechanism 11 which may be a recording pen or other suitable indicator which will make a mark upon the chart 10. The recording mechanism 11 is moved along the X axis of the chart 10 by a motor 12 while the recording mechanism 11 is moved along the Y axis by a motor 13.

The motor 12 is arranged to be driven by a suitable electronic amplifier 14 while the motor 13 is arranged to be driven by a suitable amplifier 15. The amplifiers 14 and 15 may be of the type which will have an alternating current input signal of reversible phase and which will produce rotation of the motor connected thereto in a direction dependent upon the phase of the signal on the input. An amplifier-motor combination of a suitable type wil be found in the Walter P. Wills patent, 2,423,540, issued July 8, 1947.

The driving connection between the motor 12 and the recording mechanism 11 is by way of a worm gear 16 and follower 17 while the driving connection between the motor 13 and the recorder mechanism 11 is by way of a worm gear 18 and a follower 19. It will be obvious that various other types of drives may be employed in order to impart movement of the recording mechanism 11 with respect to the chart 10.

The follower 17 has on the opposite end thereof a slider 20 which is arranged to move over a suitable slide wire 21. Also associated with the slide wire 21 is a further potentiometer 22, the potentiometer 22 and the slide wire 21 being energized by a suitable alternating current source of power 23. The electrical signals present on the slider 20 and potentiometer 22 are passed through suitable summing resistors 24 and 25 and a further summing resistor 26 to the input of the amplifier 14 by way of a span adjusting slide wire 27 and slider 28. Connected between the junction of summing resistor 26 and the slide wire 27 is a grounding resistor 29.

Associated with the follower 19 is a slider 30 which is arranged to move over a suitable slide wire 31. Connected in parallel with the slide wire 31 is an adjusting potentiometer 32. This adjusting potentiometer and the slide wire 31 are connected to a suitable source of power comprising a transformer 33 which has a grounded center tap on the secondary thereof. The slider 30 and the potentiometer 32 are connected through a pair of summing resistors 34 and 35 to a further summing resistor 36, the latter of which is connected to one end of a span adjusting slide wire 37 having a slider 38. Between the junction of the resistor 36 and the slide wire 37 is a grounding resistor 39.

For producing a sinusoidal input signal, there is provided an adjustable constant speed driving device 45 which drives, through a gear train 46, a shaft 47 connected to a Scotch yoke mechanism 48. The Scotch yoke mechanism 48 is a mechanism for converting the rotary motion of shaft 47 into a linear motion which varies sinusoidally. This sinusoidal motion produced by the Scotch yoke 48 is transmitted by a shaft 50 to a motion to pressure transducer 51 which will produce a varying pneumatic pressure on the output thereof in conduit 52, which pressure will vary sinusoidally. The transducer 51 is provided with an input air pressure conduit 53 which may be connected to any suitable source of pneumatic pressure. The sinusoidally varying pressure in the conduit 52 may be fed directly to conduit 54 and pneumatic switch 55 to a pressure to electric transducer 56, said transducer may be a pressure operated strain gauge, such as the type known commercially as a Statham gauge. The Statham gauge is arranged to have a pressure input which is used to strain the arms of a plurality of strain resistors which may be connected into a suitable bridge network indicated at 57. The straining of the bridge elements in the bridge 57 will produce an electrical output signal in accordance with the magnitude of the unbalance of the bridge. The output of the bridge 57 is connected by conductors 58 and 59 to the slidewire 27 on the input of the amplifier 14 and by the conductors 58 and 60 to the slidewire 37 on the input of the amplifier 15.

Power is supplied to the bridge 57 by a suitable transformer 61 having a center tapped primary winding 62 and a pair of secondary windings 63 and 66, the latter of which is connected to the bridge 57. The secondary 63 is connected to a suppression potentiometer 64 which has the slider thereof connected through a summing resistor 65 to the conductor 58. The suppression potentiometer functions to balance out the zero signal of the bridge 57 when there is a balance condition present. The primary 62 of the transformer 61 is connected to a suitable source of power through a line switch 68 and a reversing switch 69 which serves to connect one line of the input power source to either end of the primary 62 by way of contacts 70 and 71. The need for this will be explained below.

The operating mechanism for the switch 69 is a push rod 72 which is actuated by a cam 73. The cam 73 is driven by the driving mechanism 45 by way of the shaft 47 and a phase shifting differential 74. The differential gearing 74 acts in the usual manner to change the angular relation between the driving shaft 47 and a shaft 75 which connects to the cam 73. An adjusting element 76 may be used to adjust the relative angular position between the shaft 47 and the shaft 75 when the apparatus is set, the shafts 47 and 75 will rotate at the same speeds but with their relative positions displaced in accordance with the adjustment of the knob 76.

Also driven by the shaft 75 is a further switching cam 77 and this switching cam operates on a plurality of switch blades 78, 79, 80, and 81. These switch blades are normally biased into engagement with their respective contacts 82, 83, 84, and 85. As the shaft rotates the switching cam 77 will strike the blades in the order named and will move the blades out of engagement with the respective contacts for an angular rotation of the shaft 75 of approximately six degrees. These contacts and switch blades are used to control the energization of a pair of relays 90 and 91. The relay 90 comprises a relay coil 92 which operates upon a pair of switch blades 93 and 94 and when energized holds these blades into engagement with their respective contacts 95 and 96. The relay 91 comprises a relay coil 97 which normally operates upon a pair of switch blades 98 and 99 to maintain these blades in contact with their respective contacts 100 and 101. When the relays are deenergized, the switch blades move out of engagement with their respective contacts.

Power for the relays 90 and 91 is supplied by a suitable source of power including a transformer 102 having a center tapped secondary winding 103 and a pair of rectifiers 104 and 105 for producing a direct current output on a conductor 106 for use in the controlling of the energization of the relays 90 and 91.

The apparatus also includes a pair of pneumatic conduits 108 and 109 which are arranged for connection to a process or device 110 which may be under test to determine the transfer function thereof.

Considering now the operation of the apparatus shown in Figure 1, it will be assumed that the driving device 45 is operating at a constant speed which is producing angular rotation of the shaft 47 which is approximately 5 revolutions per minute. The rotating movement of the shaft 47 will be converted, by the Scotch yoke mechanism 48, into a sinusoidal wave motion of the connecting shaft 50 and this shaft in turn, through the device 51 will produce a sinusoidally varying pneumatic pressure in the conduit 52. With the pneumatic switch 55 positioned so that the conduit 54 is connected directly to the transducer 56, the sinusoidally varying pressure in the conduit 52 will be reflected directly to the transducer 56 and the bridge 57 will be electrically unbalanced at a sinusoidally varying rate which will correspond to the rate of operation of the Scotch yoke 48 and there will appear upon the output of the bridge 57 on the conductor 58 a sinusoidally varying electrical signal which will be varied at a rate of the assumed frequency of 5 cycles per minute. This 5 cycle per minute signal on conductor 58 is actually a power line frequency signal, for example 60 cycles per second, which is modulated at 5 cycles per minute. The electrical phasing of the 60 cycle "carrier" during one half cycle of the 5 cycle per minute signal will be of one polarity and in the next half cycle of the 5 cycle per minute signal will be of the opposite polarity with the amplitude of the signals varying in accordance with the instantaneous magnitude of the 5 cycle per minute signal or in accordance with the change in balance in the bridge 57. The reversing switch blade 69 and the cooperating contacts 70 and 71 are provided which periodically reverse the phase of the 60 cycle signal on the output of bridge 57.

The 5 cycle per minute signal which is being carried on a 60 cycle per second carrier is fed through the conductor 59 to the slide wire 27 and the slider 28 to the input of the amplifier 14. The signal is also applied through the conductor 60, to the slide wire 37, and slider 38 to the input of amplifier 15.

Considering first the operation of the amplifier 14, it will be noted that the amplifier has a portion of the input signal thereof grounded as well as a grounding of the output connection to the X axis drive motor 12. This grounding connection is by way of the switch blades and contacts of the relay 91. The grounding of the output of the amplifier may be traced from the amplifier output conductor 105 through conductor 106, switch contact 100, switch blade 98, and ground connection 107. A portion of the input signal to the amplifier 14 is also grounded and may be traced from the junction of the summing resistors 24 and 26 through conductor 106, switch contact 101, and switch blade 99 through the ground connection 107. As long as these grounding contacts are closed, the input signal to the amplifier 14 is ineffective and the motor 12 will remain stationary. However, as the shaft 75 rotates the switching cam 77 will come into contact with the blade 79 and will move it out of engagement with the contact 83. This will break the energizing circuit to the relay 91 and the relay will move to the deenergized position where the blades 98 and 99 will move out of engagement with their respective contacts 100 and 101. This has the effect of activating the amplifier 14 and the motor 12 so that they can respond to the input signals to the amplifier 14. As the shaft 75 is rotating at the same speed as the shaft 47, the switch blade 79 will open circuit with its respective contact 83 once during each cycle of the 5 cycle per minute signal. The time that the switch blade remains open is selected to be approximately 6 degrees, this figure being selected as a compromise between a signal which would give greater time for the amplifier and motor 12 to reach a balance position and the desirability of having an instantaneous sampling of the magnitude of the signal under examination.

When the amplifier 14 and motor 12 have been activated, the amplifier 14 will have on the input thereof an electrical signal originating from the balancing slider 20, an electrical signal originating from the zeroing potentiometer 22, an electrical signal from the potentiometer 64, and an electrical signal originating from the bridge 57. If there is any electrical unbalance on the input of the amplifier 14 indicating a difference between the magnitudes of the signals on the various input circuits, the amplifier 14 will be operative to drive the motor 12 so that the follower 17 will reposition the slider 20 to obtain a null or balance on the input of the amplifier 14. As this will be at a relatively short interval during the overall lengths of the 5 cycle per minute signal, the amplifier 14 will drive the motor 12 to a balance position which will be representative of a substantially instantaneous value of the five cycle per minute signal, that value being the value which is on the output of the bridge 57 during the interval when the amplifier 14 and motor 12 are activated by the opening of the switch 79 and contact 83.

As the apparatus continues to operate shaft 47 will continue to rotate as will the shaft 75 and as soon as the switching cam 77 has cleared the blade 79, the blade will move into engagement with contact 83 to again energize the relay 91 which will deactivate the amplifier 14 and motor 12. The apparatus will continue to operate until the switching cam 77 strikes the blade 80 when it will move the blade 80 out of engagement with contact 84. This will break the energizing circuit to the relay 90 and this relay will move to the deenergized position. The relay 90 is arranged to control the activation and deactivation of the amplifier 15 and the motor 13 as will be seen when it is noted that the amplifier input has a portion thereof grounded by a connection from the junction of the resistors 35 and 36 through conductor 120, contact 95, switch blade 93, and ground 121. The driving connection from the amplifier 15 to the motor 13 at 122 is grounded by a conductor 123, contact 96, and blade 94 to the ground connection 121. While the blade 93 is engaging the contact 95 and the blade 94 is engaging contact 96, the amplifier 15 and motor 13 will be deactivated. When the blade 80 separates from the contact 84, the energizing circuit for the relay 90 will be broken and the relay 90 will move to the deenergized position. The apparatus is arranged so that the blades 79, 80, 81 and 82 are separated by 90 degrees of shaft rotation of shaft 75 and are arranged so that switching operation will occur every ninety degrees of the signal which is produced by the Scotch yoke mechanism 48.

When the amplifier 15 and motor 13 are activated by the deenergization of the relay 90, the amplifier 15 will be effective to drive the motor 13 if there is an unbalance signal on the input thereof. The input in this instance is the signal from the slider 30 of the balancing slide wire 31, the signal from the zeroing potentiometer 32, the signal from the suppression potentiometer 64, and the signal originating from the bridge 57. If there is an unbalance signal during the interval which the apparatus is operative the amplifier will drive the motor 13 so that the same will reposition the recording mechanism 11 and the slider 30 until an electrical balance has been reached on the input of the amplifier.

As the apparatus continues to operate and the shaft 75 continues to rotate the amplifier 15 and motor 13 will again be deactivated and the amplifier 14 and motor 12 will be activated by the deenergization of the relay 91 when the blade 81 is caused to separate from its associated contact 85 when the switching cam 77 strikes the same. In the absence of some arrangement for reversing the phasing of the 60 cycle signal on the bridge 57, when the 5 cycle per minute signal is sampled during the second half cycle, the apparatus of amplifier 14 and motor 12 as well as amplifier 15 and motor 13 would attempt to drive to the coordinates which are 180 degrees separated from that initially considered. This is due to the fact that the amplifiers 14 and 15 are phase sensitive and will drive their respective motors in accordance with the electrical phasing of the signal on the input. By reversing the phasing of the bridge 57 every half cycle of the five cycle per minute signal, it is possible to retain the operation of the motors 12 and 13 in the same coordinate and yet retain the higher degree of accuracy obtained by sampling the control signal or five cycle per minute signal at as many intervals as convenient. Thus, when the relay 91 is deenergized and the amplifier 14 and motor 12 are reactivated, the amplifier 14 and motor 12 will seek a null position and this position will be the same as before if the measured wave is symmetrical and there has been no other change in the circuit parameters.

The apparatus in continuing to operate will produce further shaft rotation of the shaft 75 so as to deactivate the amplifier 14 and motor 12 and to reactivate the amplifier 15 and motor 13 when the blade 78 is separated from contact 82 and the relay 90 is deenergized. Again the amplifier 15 and motor 13 will operate until a null position is reached and said position should be the same unless there has been a change in the circuit parameters or the input control signal is not symmetrical.

Nonsymmetry present in the five cycle per minute carrier signal may possibly be due to the fact that the bridge 57 is not completely balanced or the transducer 56 is not balanced when there is no input drive signal. This unbalance may be eliminated by the adjustment of the suppression potentiometer 64 so that there is added into the circuit at conductor 58 an electrical signal which will cancel out the unbalance. Once this adjustment has been made it should be unnecessary to make further adjustment as long as the same bridge network is in use and there is no appreciable shifting of the balance thereof.

Figure 3:
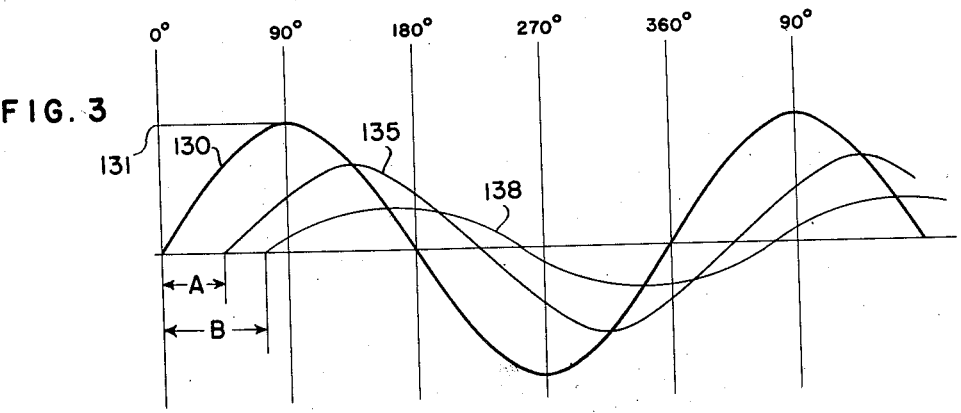
Figure 3 shows wave forms representative of the operation of Figure 1.

In order to better consider the operation of the apparatus in Figure 1, reference should be made to Figure 3 wherein is shown the sinusoidal plot of a number of signals appearing in the apparatus of Figure 1. The sine wave indicated by the numeral 130 may be used to designate the electrical characteristics of the output of the bridge 57 when the sinusoidally varying pressure in the conduit 52 is used to directly drive the transducer 56. In practice, it is generally customary to set up the reference or input control signal which would be the signal 130 so that it is a sine wave which passes through the origin of the axis at zero degrees and at 180 degrees. The amplitude of the signal will be as indicated at 131 in Figure 3. In order to see that the wave 130, which is in effect the output signal from the transducer 51, is properly aligned with respect to the measuring axis, the adjusting knob 76 is varied until the desired phasing is had. This will be indicated by the Y axis motor 13 moving the recording mechanism until the center of the recording chart is reached to indicate zero deviation along the Y axis and with the X axis motor 12 driving the recording mechanism 11 until the position of the recording mechanism 11 along the X axis is representative of the amplitude of the signal 130. This would be indicated by 132 in the graphical presentation shown in Figure 4. This point may be used to establish a reference point in making further measurements upon a process or device under investigation.

Figure 4:
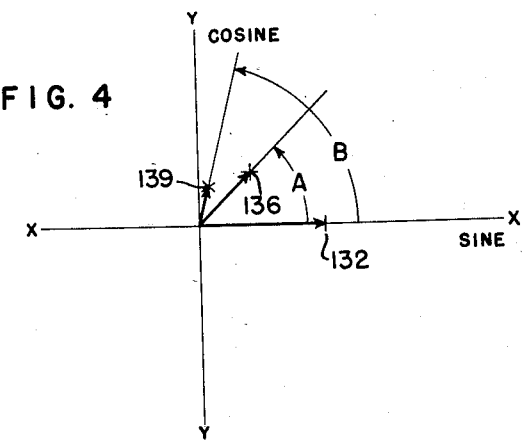
Figure 4 shows the graphical presentation of the wave forms considered in Figure 3.

If now the transfer function of a device is to be determined, the device may be connected as indicated at 110 to the conduits 108 and 109 and the pneumatic switch 55 will be turned to a position where the conduit 109 and the pressures therein will be fed directly to the transducer 56 so that the variations will vary the balance of the bridge 57. The device 110, or process 110, will now be introducing into the output signal from the transducer 51 a time delay and a change in the amplitude of the signal applied to the input thereof. In this instance, for example, it will be assumed that the phase shift is appreciable and that there is a loss of amplitude in the signal appearing in the conduit 109 and on the input of the transducer 56. Referring to Figure 3, numeral 135 may be used to represent the signal on the input of the transducer 56. In this instance the signal on the bridge 57 will again be applied to the amplifiers 14 and 15 and these amplifiers will drive their respective motors 12 and 13 in accordance with the electrical signal existing during the intervals when the activating relays 90 and 91 are deenergized. This will result in the recording mechanism 11 being positioned on the recording chart 10 to a position on the X axis which will be representative of the X axis component of the vector representing the wave 135 and upon the Y axis in accordance with the Y axis component of the vector representing the wave 135. This is represented in Figure 4 by the numeral 136. By projecting a line from the origin of the graph to the point 136, there is obtained a measure of the amplitude of the wave 135 and by measuring the phase angle A between the line produced by the input signal 130 and the line produced by the signal 135 there is obtained a measure of the phase shift between the input and output. The amplitude indicated by the point 136 in Figure 4 and the phase angle indicated by the angle A is indicative of the transfer function of the device 110 which is under test at the frequency under consideration. This can be shown mathematically as follows:

Signal input $= A \sin Wt$ $A$ = amplitude of input signal
$g$ = device or process gain
$\theta$ = phase shift in the process Signal output $= gA \sin (Wt+\theta)+C$.

When $Wt=0$, the output signal $= gA \sin \theta + C$

When $Wt=\frac{\pi}{2}$, the output signal $= gA \sin\left(\theta+\frac{\pi}{2}\right)+C$ Since $\sin \theta+\frac{\pi}{2}=\cos \theta$, the output signal $= gA \cos \theta + C$ By neglecting C, the output wave may be considered in its component vector parts by the terms $gA \sin \theta$ and $gA \cos \theta$.

By taking additional readings at $\pi$ and $$\frac{3\pi}{2}$$

and reversing the phasing of the latter by 180 degrees, to put the readings in the same quadrants four points can be sampled in each wave by the operation of the switches.

In the event that the frequency of operation of the driving mechanism 45 is increased so that the cyclic operation of the Scotch yoke 48 is increased, the expected transfer function from the apparatus 110 will generally change. In most instances this change will be a decrease in the amplitude of the output signal from the device under test as well as an increase in the phase shift of the signal on the output. This has been represented by the wave 138 of Figure 3. As before, the apparatus will operate with the X axis motor 12 operating to determine the X axis component of the vector of the wave 138 and the Y axis motor 13 operating to determine the Y axis component of the vector of the wave 138. This will produce a point 139 upon the graph shown in Figure 4, or upon the recording chart 10 of Figure 1. The amplitude of the signal will be indicated by a projection from the origin of the graph to the point 139. The phase angle will be indicated by the angle between the reference wave along the X axis to a line extending from the origin to the point 139 and this phase angle will be indicated by angle B.

If additional characteristics of the operation of the device under test are desired, the frequency of the input or driving signal for the device may be varied and a number of points obtained upon the recording chart 10. These points are then available for determining the operating characteristics of the appaartus.

Figure 2:
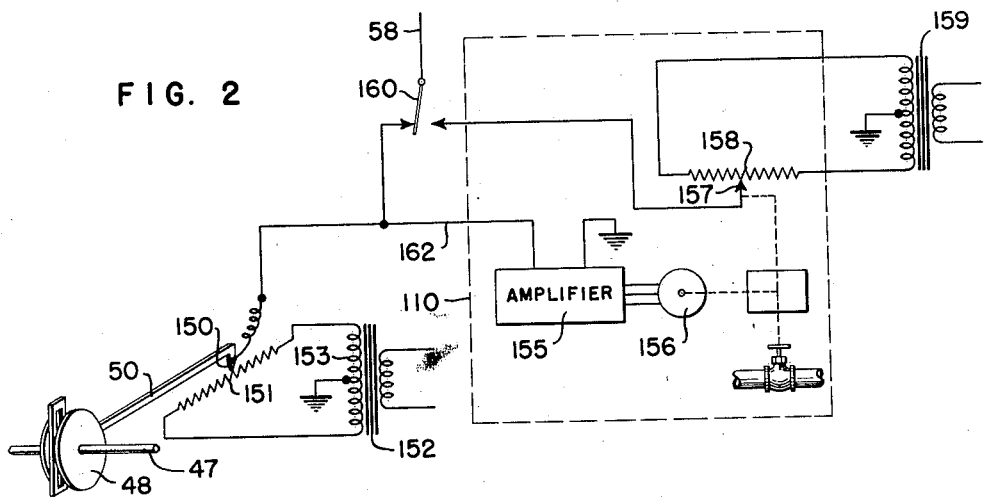
Figure 2 shows a portion of the apparatus shown in Figure 1 modified for use in an all electrical apparatus.

Referring now to the modified portion of the apparatus shown in Figure 2, there is shown a number of components which correspond to those in Figure 1 and where they do correspond they carry corresponding reference numerals. In this particular modification the Scotch yoke mechanism 48 is arranged to drive the rod 50 in a sinusoidal motion as before and this moves a slider 150 over a suitable slide wire 151. Slide wire 151 is arranged to have power supplied thereto by a suitable power transformer 152 having a center tapped secondary winding 153. The device 110 under test may be, in this instance, an electrical type of apparatus having an electrical input and having a motor drive on the output which moves a slider over an associated slide wire and may also operate upon a valve positioner. This is indicated in the figure by an amplifier 155 which is connected to drive a motor 156. It may be an amplifier motor combination as set forth in the above mentioned Wills patent. The motor 156 is arranged for connection to a slider 157 which cooperates with an associated slide wire 158, the latter of which is energized by a suitable transformer 159. An electrical switch 160 replaces the pneumatic switch 55 for connecting the input signal and the output signal to the recording apparatus.

The operation of the modified form of the apparatus shown in Figure 2 is substantially the same as that of Figure 1 except that instead of going through a pressure system, the apparatus directly produces an electrical signal which is connected directly to the conductor 58 on the input of the amplifiers 14 and 15. In setting the apparatus up, it is generally expedient to set the reference signal produced by the slider 150 moving over the slide wire 51 to correspond to the reference signal originally set up in bridge 57 in the apparatus shown in Figure 1. The transfer function of the apparatus 110 may be determined with respect to the reference signal by switching the switch 160 into a position where it receives a signal from the slider 157 and this slider may be lagging behind the operation of the signal produced by the slider 150 moving over the slide wire 151, said signal being applied to the input of the amplifier 155 by way of the conductor 162. It will be possible by this arrangement to obtain a like set of points as shown in Figure 4 as concerns the amplifier 155 driving the motor 156.

While the apparatus may produce a set of points as indicated in Figure 4, it will be obvious that these points are representative only and will be dependent upon several factors in the apparatus or process under investigation. It will also be obvious that there has been provided an indicating and recording mechanism which will accurately record the transfer function of an apparatus under test where that transfer function is derived from a forcing function signal or input signal which is of very low frequency. While the frequency of five cycles per minute was arbitrarily selected in discussing the operation, this frequency may be in terms of cycles per hour and may also be in terms of cycles per second with one version of the apparatus operating satisfactorily as high as four cycles per second.

While, in accordance with the provisions of the statutes, there has been illustrated and described the best forms of the invention known to me, it will be apparent to those skilled in the art that changes may be made in the forms of the apparatus disclosed without departing from the spirit of the invention as set forth in the appended claims, and that in some cases certain features of the invention may be used to advantage without a corresponding use of other features.

Having now described my invention what I claim as new and desire to secure by Letters Patent is as follows:

1. In a recorder for determining the transfer function of a device under examination, the combination comprising, adjustable constant speed driving means arranged to produce a sinusoidally varying signal whose frequency is proportional to the speed of said driving means, a plurality of switch means arranged to be actuated by said driving means at predetermined points during each cycle, a recording mechanism comprising a pair of motors arranged to drive a recording mechanism over a chart, an amplifier for driving each of said motors, means including said switch means for rendering said amplifier effective only during predetermined portions of said cycle, and an electrical signal input to said amplifier, said input comprising a signal derived from said sinusoidal signal producing means.

2. Apparatus for making a two-axis plot of a control signal with respect to a reference, the combination comprising, a two coordinate recording mechanism including an amplifier driven motor for producing a first axis movement and a further amplifier driven motor for producing a second axis movement, a sinusoidal signal producing device comprising an adjustable constant speed motor, said sinusoidal signal being applied to the inputs of said amplifiers, and switch means actuated by said adjustable constant speed motor, said switch means rendering said amplifiers effective to control their respective motors only during short predetermined intervals of each cycle of said signal.

3. Apparatus for indicating phase shift and gain of a control signal passed through a device under test, comprising, an adjustable constant speed motor, a sinusoidal signal producing device driven by said motor, a control signal producing device having a signal derived from said sinusoidal signal producing device and which control signal may be the input or output of a device under test, a recording mechanism comprising, a first motor which is arranged to produce a recording operation in one axis and a second motor which is arranged to produce a recording operation in a second axis, a first signal balancing slider for said first motor and a second signal balancing slider for said second motor, switch means actuated by said constant speed motor and operating during short fixed intervals of each cycle of said sinusoidal signal, said switch means rendering said first motor operative for a period and then said second motor operative for a period, and means connecting said control signal to said first and second motor and said respective signal producing sliders to said motors so that said motors when operative will operate until a balance is reached.

4. Apparatus for indicating phase shift and gain of a control signal passed through a device under test, comprising, an adjustable constant speed motor, a sinusoidal signal producing device driven by said motor, an electrical signal circuit arranged to have thereon a signal derived from said sinusoidal signal producing means and indicative of the input or output from a device under test, coupling means for coupling said electrical signal circuit to said sinusoidal signal producing device, a recording mechanism comprising a first motor which is arranged to produce a recording operation in one axis and a second motor which is arranged to produce a recording operation in a second axis, a first signal balancing slider arranged to be driven by said first motor and a second signal balancing slider arranged to be driven by said second motor, switch means actuated by said constant speed motor and being effective during short fixed intervals of each cycle of said sinusoidal signal, said switch means rendering said first motor means operative for a period and then said second motors operative for a period, and means connecting said electrical signal circuit to said first and second motor means and said respective signal balancing sliders to said motors so that said motors when operative will operate until a balance is reached.

5. Apparatus for indicating phase shift and gain of a control signal passed through a device under test, comprising, an adjustable constant speed drive motor, a sinusoidal signal producing device driven by said motor, an electrical signal circuit arranged to have thereon a signal derived from said sinusoidal signal producing device which is indicative of the input to or output from a device under test, coupling means for selectively coupling said electrical signal circuit to said sinusoidal signal producing device, periodically operating switch means actuated by said drive motor, said switch means being actuated to an operative condition during a short preselected interval in each cycle of said sinusoidal signal, a pair of recording motors arranged to be energized alternately by said switch means, and circuit means connecting said motors to said electrical signal circuit, said motors responding to the instantaneous signal from said electrical signal circuit when said switches are actuating said motors.

6. Apparatus for recording the instantaneous character of a sine wave comprising, a two coordinate recorder mechanism having a first motor actuating said mechanism in the one axis and a second motor actuating said mechanism in the second axis, means for producing an electrical sinusoidally varying control signal, switch means actuated synchronously with said control signal and arranged to control said first and second motor means, said switch means being operable to actuate said first motor means in time relation to said control signal to respond to a first instantaneous value of said control signal which is a first function thereof, said switch means being further operable to actuate said second motor means to respond to a second instantaneous value of said control signal which is a second function of said control signal, said recorder mechanism being operable by said first and second motor means to produce an indication of phase angle and amplitude of said control signal.

7. Apparatus for indicating the instantaneous amplitudes of a sinusoidal wave, comprising, a two coordinate recorder having a first motor for adjusting said recorder in a first axis and a second motor for adjusting said recorder in a second axis, signal generating means for producing the sinusoidal wave, first switch means operatively coupled to be synchronized with said sinusoidal wave, said first switch being operable to render said first motor operative in accordance with a first instantaneous value of said wave and to render said second motor operative in accordance with a second instantaneous value of said wave, and second switch means synchronized with said wave and connected to said generating means so that the polarity of said wave as said first switch means operates is always the same as far as said motors are concerned.

8. Apparatus for indicating the instantaneous components of a sinusoidal wave comprising, a two coordinate recorder having a first motor for adjusting said recorder in a first axis and a second motor for adjusting said recorder in a second axis, an electromechanical switch means operatively coupled to be synchronized with said sinusoidal wave, said switch being operable to render said first motor operative in accordance with a first instantaneous value of said wave and to render said second motor operative in accordance with a second instantaneous value of said wave.

9. Recording apparatus for a sinusoidal signal comprising, a recording chart having two axes of indication, one of which is indicative of a first function of said signal and the other of which is indicative of a second function of said signal, an adjustable constant speed motor, a sinusoidal wave producing apparatus driven by said motor, an electrical sinusoidal signal producing device having an output indicative of an input signal or an output signal of an apparatus under test, said electrical signal being derived from said wave producing apparatus, a pair of switching means alternately actuated by said motor and synchronously operating during short predetermined periods of each cycle of said signal with one actuated at an interval representative of a first function of said signal and the other actuated at an interval representative of a second function of said signal, a first function motor connected to adjust the point of indication along said one axis of indication of said chart, a second function motor connected to adjust the point of indication along the other axis of indication of said chart, a first balancing circuit adjusted by said first function motor, a second balancing circuit adjusted by said second function motor, and means including said switching means rendering said electrical signal effective first on said first function motor and then on said second function motor, said motors when so affected operating their respective balancing circuits to a null so that said recording chart will have thereon an indication of its first and second functions of said electrical signal.

10. Recording apparatus for a sinusoidal signal comprising, a recording chart having two axes of indication, one of which is indicative of a first function of said signal and the other of which is indicative of a second function of said signal, an adjustable constant speed motor, a sinusoidal wave producing apparatus driven by said motor, an electrical sinusoidal signal producing device having an output indicative of a signal derived from said wave producing apparatus, said electrical signal having the same frequency as the wave produced by said apparatus, an electrical circuit for electrically balancing the output of said device, a pair of switching means alternately actuated by said motor and synchronously operating during short predetermined periods of each cycle of said signal with one of said switching means being actuated at an interval representative of a first function of said signal and the other being actuated at an interval representative of a second function of said signal, a first function motor connected to adjust the point of indication along said one axis of indication of said chart, a second function motor connected to adjust the point of indication along the other axis of indication of said chart, a first balancing circuit adjusted by said first function motor, a second balancing circuit adjusted by said second function motor, and means including said switching means rendering said electrical signal effective first on said first function motor and then on said second function motor, said motors when so effected operating their respective balancing circuit to a null so that the resultant adjustment of said recording chart will be in accordance with a first function and a second function of said electrical signal.

11. Recording apparatus for a sinusoidal signal comprising, a recording chart having two axes of indication, one of which is indicative of a first function of said signal and the other of which is indicative of a second function of said signal, an adjustable constant speed motor, a sinusoidal wave producing apparatus driven by said motor, an electrical sinusoidal signal producing device having an output indicative of a signal derived from said wave producing apparatus, a pair of switching means alternately actuated by said motor and synchronously operating during short predetermined periods 90 electrical degrees apart in each cycle of said signal, a first function motor connected to adjust the point of indication along said one axis of indication of said chart, a second function motor connected to adjust the point of indication along the other axis of indication of said chart, a first balancing circuit adjusted by said first function motor, a second balancing circuit adjusted by said second function motor, and means including said switching means rendering said electrical signal effective first on said first function motor and then said second function motor, said motors when so affected operating their respective balancing circuits to a null so that said recording chart will have thereon an indication of the first and second functions of said electrical signal.

References Cited in the file of this patent

UNITED STATES PATENTS

| 830,718 | Holt | Sept. 11, 1906 |
| 2,224,182 | Crooke | Dec. 10, 1940 |
| 2,475,314 | Dehmel | July 5, 1949 |
| 2,529,468 | Dehmel | Nov. 7, 1950 |
| 2,584,267 | Hayek | Feb. 5, 1952 |
| 2,620,256 | Kerns et al. | Dec. 2, 1952 |

FOREIGN PATENTS

| 423,227 | Great Britain | Jan. 28, 1935 |